J. C. SPARKS.
WIND-MILL.
No. 176,558. Patented April 25, 1876.
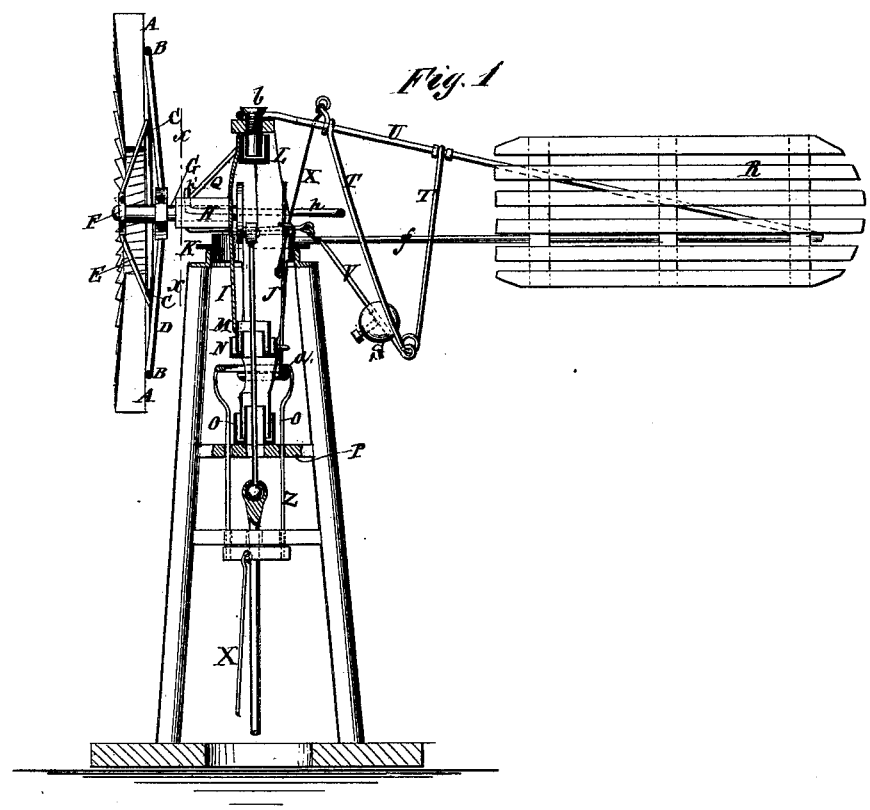
Fig. 1
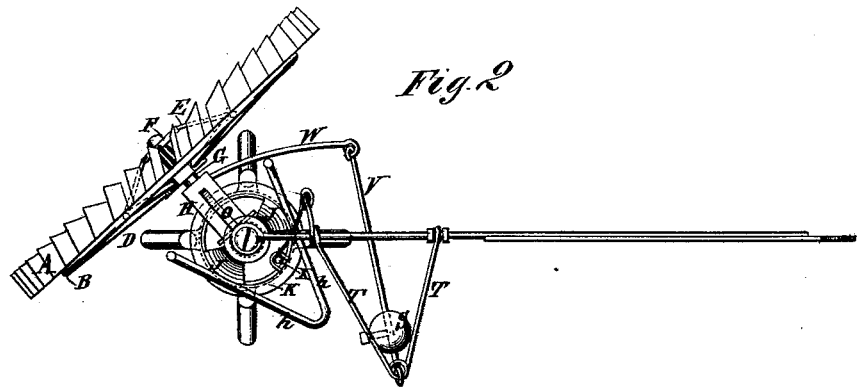
Fig. 2
Fig. 3
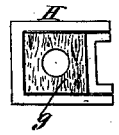
WITNESSES:
A. W. Almqvist
John Goethals
INVENTOR:
J. C. Sparks
ATTORNEYS.

UNITED STATES PATENT OFFICE.

JASON C. SPARKS, OF TIPTON, IOWA.

IMPROVEMENT IN WINDMILLS.

Specification forming part of Letters Patent No. 176,558, dated April 25, 1876; application filed March 6, 1876.

*To all whom it may concern:*

Be it known that I, JASON C. SPARKS, of Tipton, in the county of Cedar and State of Iowa, have invented a new and Improved Windmill, of which the following is a specification:

My invention relates to that class of mills in which a wheel with fixed vanes is used, the wheel-supports being jointed to the turn-table carrying the tail-vane, so that it swings around edgewise to the wind to adjust it to the varying power of the wind and to stop it; and the invention consists of improvements in the construction and arrangement of the wheel and the mechanism in connection with it calculated to simplify the same and increase the efficiency.

Figure 1 is a sectional elevation of my improved windmill. Fig. 2 is a top view, and Fig. 3 is a detail of the bearing for the main shaft.

Similar letters of reference indicate corresponding parts.

The vanes A of the wheel are attached to the rings B C, supported by the arms D, the arms being arranged in "dishing" form, and having the short arms E and the secondary hub F combined with them in the manner shown, by which great strength is obtained with light material. The shaft G is carried in the long bearing H, which is attached to the upright bar I, which is pivoted, at L M, in the vertical support composing two uprights, J, having the turn-table K attached to the middle, carrying the pivot $b$ and cup $d$, and being itself pivoted at O on a plate, P, supported at the middle of the tower, or thereabout. Besides being attached directly to said bar I, the bearing is also connected to it by the strong brace Q.

The support J and turn-table K turn about on the tower for the wheel to face the wind, being operated by the tail-vane R, which is pushed around by the wind, and the wheel and its supporting-bar I turn on the pivots L M, to regulate it to the variations of the wind, being held to the wind by the weight S on arms T, pivoted to the tail-rod U, so that it is raised by rod V and arm W when the wheel is forced around, and pushes the wheel back, by falling, when the power of the wind diminishes.

A rod, X, is connected to one of the arms T, for raising the weight to regulate the wheel or stop it by hand, the said rod being connected by a swivel, Z $a$, allowing the upper portion to revolve with the wheel-support.

The upright bar I has a cup, at L, for the pivot-pin $b$ of the bars J, to hold the oil for lubrication, and its step M works in a cup, $d$, of frame J, for the same purpose. The step O of the frame J also works in a cup, $e$, for retaining the lubricating material.

The tail-vane is connected to the turn-table frame by the horizontal rod $f$, and the inclined rod U connects it to the pivot $b$ at the top, making a light but substantial connection.

I propose to use wood bearings $g$ for the wheel-shaft, arranging them so that the pressure is sustained on the grain endwise.

$h$ is a stop-rod for limiting the wheel in its movements on the turn-table.

Having thus described my invention, I claim as new and desire to secure by Letters Patent—

1. The wheel-shaft bearing H, upright supporting-bar I, brace Q, pivots L M, and the turn-table K and uprights J, combined and arranged substantially as specified.

2. The cup L on the upright I, in combination with the pivot $b$ of frame J, substantially as specified.

3. The weight S, rod V, arms T W, combined and arranged with tail-rod U, and the wheel-shaft bearing H, substantially as specified.

4. The swivel Z $a$, combined with rod X, weight S, and turn-table frame, substantially as specified.

JASON C. SPARKS.

Witnesses:
 JACOB WEAVER,
 A. W. SPARKS.